US006882529B2

(12) United States Patent
Helot et al.

(10) Patent No.: US 6,882,529 B2
(45) Date of Patent: Apr. 19, 2005

(54) MODULAR MECHANISM FOR MOVABLE DISPLAY

(75) Inventors: Jacques H Helot, Rotterdam (NL); Michael D Derocher, Corvallis, OR (US); Dennis R Esterberg, Philomath, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 124 days.

(21) Appl. No.: 10/163,444

(22) Filed: Jun. 5, 2002

(65) Prior Publication Data

US 2002/0145846 A1 Oct. 10, 2002

Related U.S. Application Data

(62) Division of application No. 09/551,287, filed on Apr. 18, 2000, now Pat. No. 6,437,973.

(51) Int. Cl.[7] .................................................. G06F 1/16
(52) U.S. Cl. ....................................... 361/686; 361/683
(58) Field of Search ................................. 361/679–683, 361/686

(56) References Cited

U.S. PATENT DOCUMENTS

| 4,859,092 A | | 8/1989 | Makita |
| 5,103,376 A | | 4/1992 | Blonder |
| 5,255,214 A | | 10/1993 | Ma |
| 5,345,362 A | | 9/1994 | Winkler |
| 5,494,447 A | | 2/1996 | Zaidan |
| 5,668,570 A | | 9/1997 | Ditzik |
| 5,805,415 A | * | 9/1998 | Tran et al. ................... 361/681 |
| 6,006,243 A | * | 12/1999 | Karidis ........................ 708/100 |
| 6,076,786 A | | 6/2000 | Meyer |
| 6,108,195 A | | 8/2000 | Behl et al. |
| 6,134,103 A | | 10/2000 | Ghanma |
| 6,229,693 B1 | | 5/2001 | Karidis et al. |
| 6,392,871 B1 | * | 5/2002 | Yanase ......................... 361/681 |
| 6,430,038 B1 | * | 8/2002 | Helot et al. .................. 361/681 |
| 6,437,973 B1 | * | 8/2002 | Helot et al. .................. 361/681 |

* cited by examiner

Primary Examiner—Yean-Hsi Chang

(57) ABSTRACT

A computer that includes a computer base, a display and an articulated mechanism formed as modules with mating mechanical connectors. The mating mechanical connectors enable the computer base to be configured with the display either directly or indirectly via the articulated mechanism. The articulated mechanism configuration enables the display to be rotatable about the bottom edge of the display at any of a plurality of viewing angles and also to be oriented above the computer base in a plurality of positions. Preferably, a stabilizer mechanism stabilizes and locks the articulated mechanism to selected angular positions.

7 Claims, 5 Drawing Sheets

MODULAR MECHANISM FOR MOVABLE DISPLAY

This application is a Divisional of U.S. Pat. No. 09/551,287 filed Apr. 18, 2000, now U.S. Pat. No. 6,437,973.

This application is related to application Ser. No. 09/551,283 for Computer With Articulated Mechanism, filed concurrently herewith and assigned to the assignee of the present application.

FIELD OF THE INVENTION

The present invention relates to a computer and, more particularly, to a computer that has a mechanical interconnect system that allows modularity.

BACKGROUND

Portable computers or notebooks typically comprise a computer base and a display. The computer base generally holds the computer processor, memory, circuitry and other components, such as a keyboard or a disk drive. Typically, the display is attached to the computer base by a hinge forming a single pivot axis, wherein the display can be folded down for carrying or up so that the user can select an appropriate viewing angle.

A disadvantage with such portable computers is that the single pivot axis limits the number of viewing positions that the user can select. The disadvantage is particularly noticeable in environments, such as airplanes and cars, in which the computer is used on the user's lap, briefcase, pull out tray, and the like. Whether used on a desk or on a lap, it is desirable to provide the user with a portable computer that includes a large spectrum of viewing positions.

Accordingly, there is a need for an improved computer that avoids the aforementioned disadvantages.

SUMMARY

A computer according to the present invention includes a computer base, a display and an articulated mechanism. A plurality of mechanical connectors is disposed on the computer base, the display and the articulated mechanism. The mechanical connectors have a size and shape that enables the display and the computer base to be either directly interconnected in a first configuration or indirectly interconnected via the articulated mechanism in a second configuration.

According to one aspect of the invention, the plurality of mechanical connectors include first, second, third, and fourth pairs of mechanical connectors. The first and second pairs of mechanical connectors are disposed on the computer base and the display, respectively. The third and fourth pairs of mechanical connectors are disposed on opposite ends of the articulated mechanism. The first pair of mechanical connectors selectively mates either with the second pair or the third pair of mechanical connectors and the fourth pair of mechanical connectors mates with the second pair of mechanical connectors. According to another aspect of the invention, the first pair of mechanical connectors is located in proximity to a rear edge of the computer base and the second pair of mechanical connectors is located in proximity to a bottom edge of the display.

According to a further aspect of the invention, the computer includes a computer base, a display and an articulated mechanism. The computer base has a front edge and a rear edge. A keyboard is disposed on the computer base in an orientation for usage from the front edge. A first pivot mechanism with a first pivot axis is disposed on the display and a second pivot mechanism with a second pivot axis is disposed on the articulated mechanism. The display rotates about the first pivot axis and the articulated mechanism rotates about the second pivot axis.

The articulated mechanism includes a first torque arm and a second torque arm interconnected with one another. The first torque arm is also interconnected with the rear edge of the computer base and the second torque arm is also interconnected with the first pivot mechanism and the display. The articulated mechanism has a motion that moves the display toward, away from the front edge, and in elevation relative to the computer base. Preferably a stabilizer mechanism stabilizes the display and the first and second torque arms selected angular positions by means of clutches associated with the pivot mechanisms.

Other and further objects, advantages and features of the present invention will be understood by reference to the following specification in conjunction with the annexed drawings, wherein like parts have been given like numbers.

DESCRIPTION OF THE PREFERRED AND ALTERNATIVE EMBODIMENTS

Figure 1:
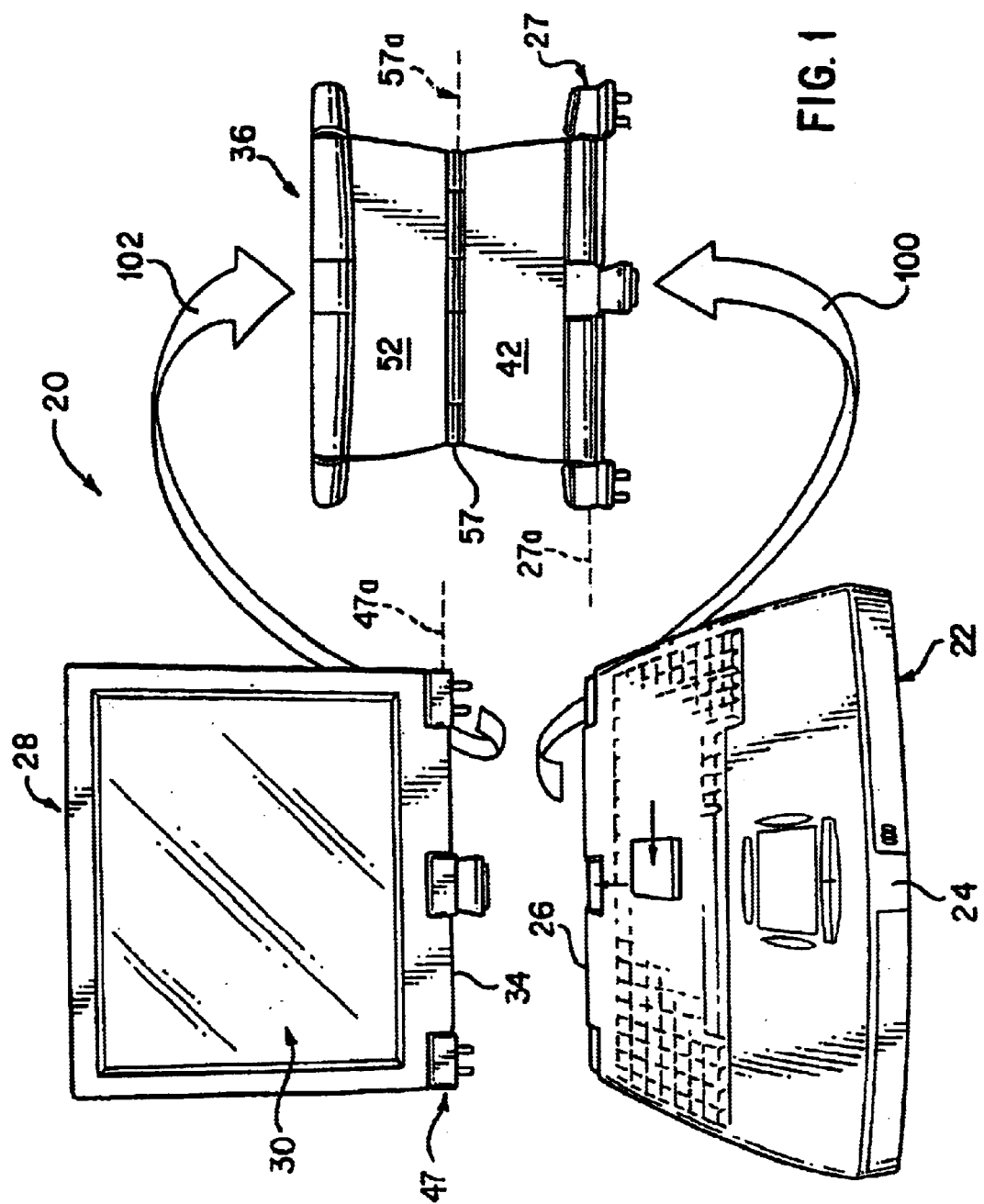
FIG. 1 is a perspective view, in part of a computer according to the present invention.

Referring to FIG.1, computer 20 includes a computer base 22, a display 28 and an articulated mechanism 36. Computer base 22 includes a user edge 24 and a rear edge 26. Display 28 includes a viewing surface 30 and a bottom edge 34.

Figure 3:
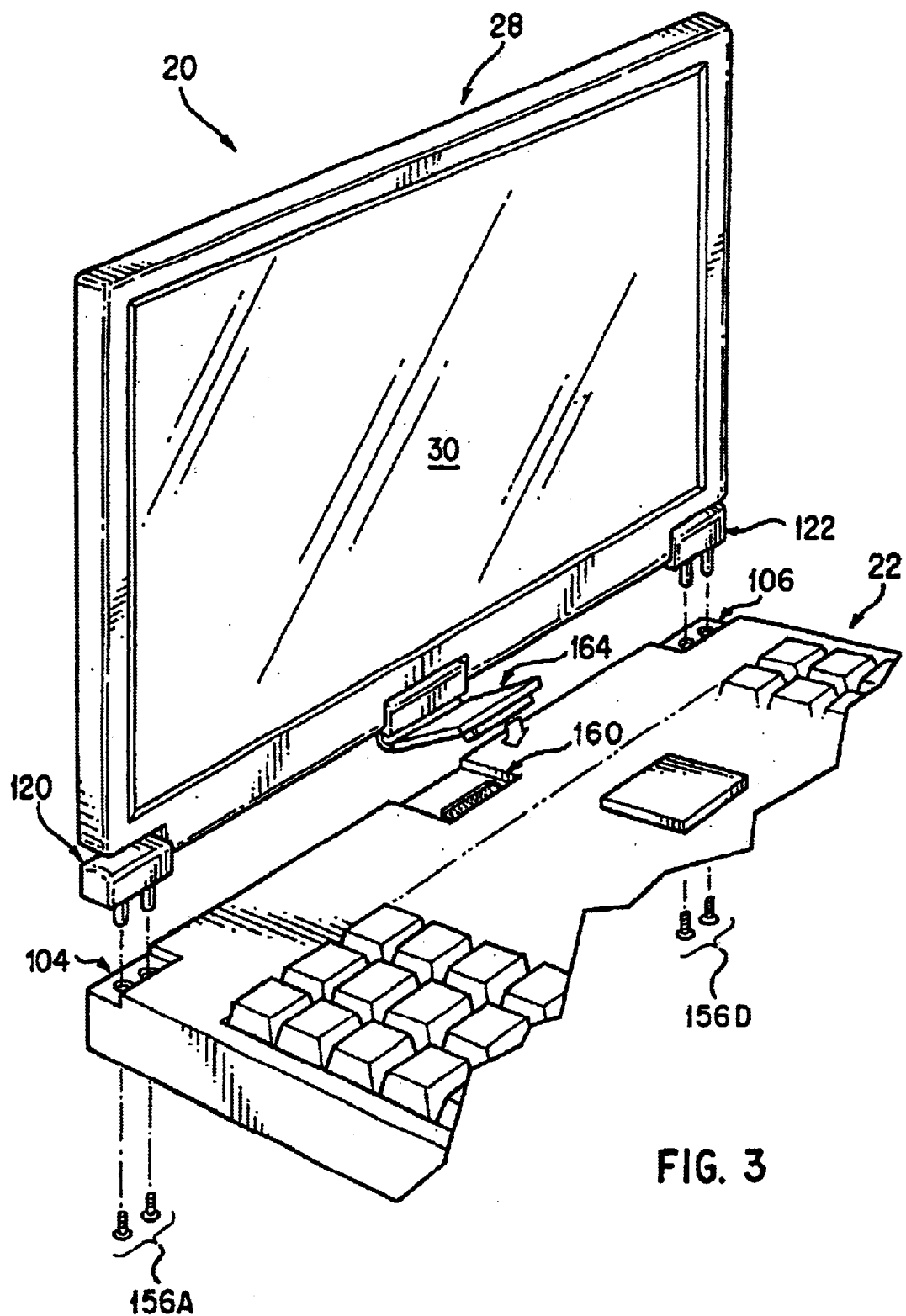
FIG. 3 is an enlarged perspective view of a computer of FIG. 1 configured with only a computer base and a display.

Computer base 22, display 28 and articulated mechanism 36 are modules that can be configured into a configuration wherein computer base 22 is interconnected indirectly with display 28 via articulated mechanism 36 as shown in FIG. 1 by arrows 100 and 102. Computer base 22 can also be configured into another configuration wherein computer base 22 is interconnected directly with display 28 as shown in FIG. 3.

Figure 2:
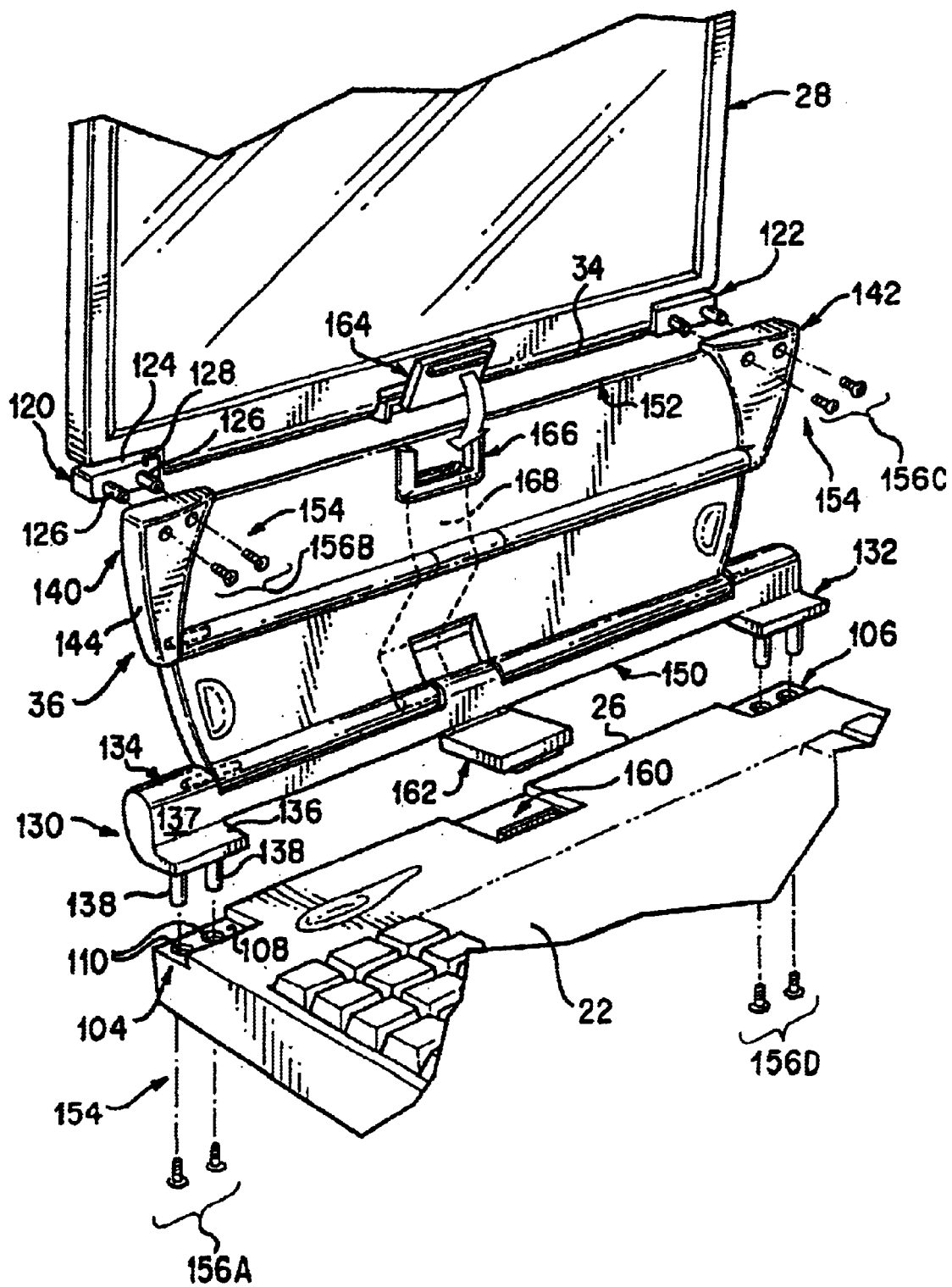
FIG. 2 is an enlarged view of a portion of FIG. 1.

Referring to FIG. 2, the modularity is provided by a plurality of mechanical connectors that includes:

- a pair of female mechanical connectors 104 and 106 disposed in proximity to rear edge 24 of computer base 22,
- a pair of male mechanical connectors 102 and 122 disposed in proximity to bottom edge 34 of display 28,
- a pair of male mechanical connectors 130 and 132 disposed in proximity to a bottom edge 150 of articulated mechanism 36, and
- a pair of female mechanical connectors 140 and 142 disposed in proximity to a top edge 152 of articulated mechanism 36.

As mechanical connectors 104 and 106 are substantially the same, only mechanical connector 104 will be described. Mechanical connector 104 includes a recess 108 with a pair of bores 110 extending vertically there through. As mechanical connectors 130 and 132 are substantially identical, only mechanical connector 130 will be described. Mechanical connector 130 includes a body 134 having a lower shelf portion 136 and an upper body portion 137. A pair of rods 138 extends vertically downward from the bottom of shelf portion 136.

As mechanical connectors 140 and 142 are substantially the same, only mechanical connector 140 will be described. Mechanical connector 140 includes a body 144 having a pair of through holes 145 extending there through. As mechanical connectors 120 and 122 are substantially identical, only mechanical connector 120 will be described. Mechanical connector 120 includes a body 124 with a pair of rods 126 extending perpendicularly from a bottom side 128.

All of the mechanical connectors 104, 106, 120, 122, 130, 132, 140 and 142 are in registry with one another for modularity. For example, first and second mechanical connectors 104 and 106 are in registry with third and fourth mechanical connectors 120 and 122 and with mechanical connectors 130 and 132. Third and fourth mechanical connectors 120 and 122 are in registry with seventh and eighth mechanical connectors 140 and 142. It will be apparent to those skilled in the art that the locations of mechanical connectors 104 and 106 can be at locations other than the corners of rear edge 26. For example, mechanical connectors 104 and 106 can be at any spaced apart locations on computer base 22 that do not interfere with normal keyboard operations. Also, mechanical connectors 120 and 122 can be at locations other than the corners of bottom edge 34 of display 28. For example, mechanical connectors 120 and 122 can be at any spaced apart locations on display 28 that do not interfere with normal use of display 28.

A securing system 154 includes pairs of screws 156A, 156B, 156C, and 156D. Screw pairs 156A and 156B secure first and second mechanical connectors 104 and 106 to fifth and sixth mechanical connectors 130 and 132 as shown in FIG. 2 or to third and fourth mechanical connectors 120 and 122 as shown in FIG. 3. Screw pairs 156B and 156C secure third and fourth mechanical connectors 120 and 122 to seventh and eighth mechanical connectors as shown in FIG. 2. For example, screw pair 156A screw into bores (not shown) in rods 138 to secure mechanical connectors 104 and 130 together. It will be apparent to those skilled in the art that fasteners other than screw pairs 156A-156D may be used to secure the mechanical connectors.

Referring to FIG. 2, computer base 22 includes a first electrical receptacle 160 that mates with a second electrical receptacle 162 for the FIG. 2 configuration. Display 28 includes a third electrical receptacle 164 that mates with a fourth electrical receptacle 166. A flat flexible cable 168 interconnects electrical receptacles 162 and 166. Electrical signals and power are coupled between computer base 22 and display 28 via the aforementioned electrical receptacles 160, 162, 164 and 166 and flexible cable 168. For the FIG. 3 configuration, electrical receptacles 160 and 164 mate with one another.

Referring back to FIG. 1, articulated mechanism 36 includes a first arm member 42 and a second arm member 52. A first pivot mechanism 27 located on articulated mechanism 36 is interconnected with first arm member 42 and rear edge 26 of computer base 22. A second pivot mechanism 47 located on display 28 is interconnected with second arm member 52 and a bottom edge 34 of display 28. First arm member 42 and 52 are pivotally coupled at a third pivot mechanism 57.

Pivot mechanism 27 may be formed with any suitable hardware, such as one or more hinges, along a pivot axis 27a that extends laterally. Pivot mechanism 47 may be similarly formed along a pivot axis 47a that extends laterally. Pivot mechanism 57 may be similarly formed along a pivot axis 57a. Pivot axes 27a, 47a and 57a are preferably parallel.

Figure 4:
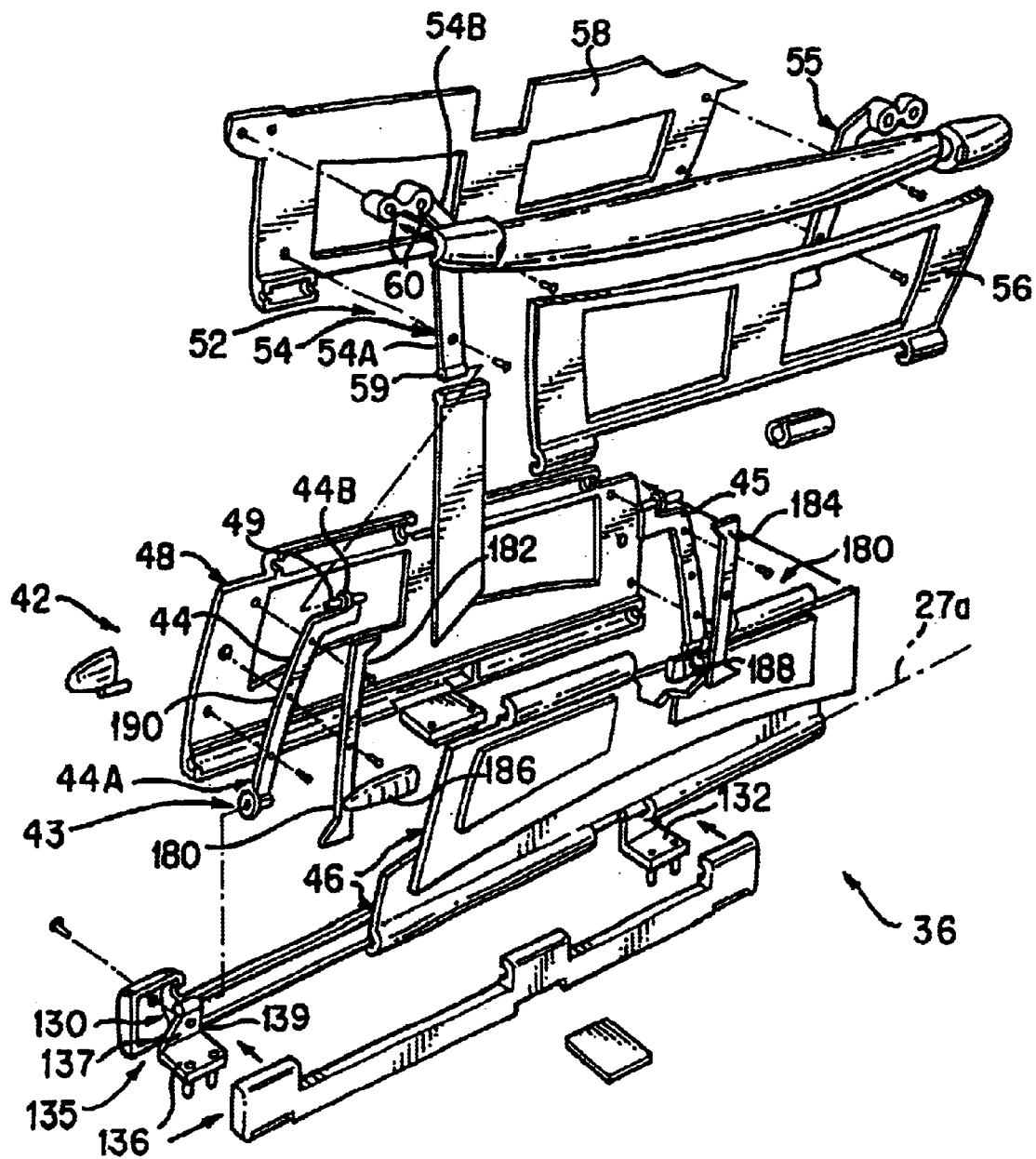
FIG. 4 is an exploded perspective view of the articulated mechanism of the computer of FIG. 1.

Referring to FIG. 4, first arm member 42 includes a pair of spaced apart torque arms 44 and 45, a front cover 46 and a back cover 48. Second arm member 52 includes a pair of spaced apart torque arms 54 and 55, a front cover 56 and a back cover 58. Torque arms 44 and 45 are substantially the same and torque arms 54 and 55 are substantially the same so that only torque arms 44 and 54 will be described. Torque arm 44 has a lower end 44A with a hinge rod 43. Mechanical connector 130 has an L-shaped bracket 135 that includes shelf portion 136 and an upright portion 137. A hinge receptacle 139 is formed in upright portion 137. Pivot mechanism 27 (see FIG. 1) is formed of hinge rod 43 and hinge receptacle 139 on the left edge and by similar parts of torque arm 45 and mechanical connector 132 on the left edge.

Torque arm 44 has an upper end 44B that has a hinge rod 49. Torque arm 54 has a lower end 54A with a hinge receptacle 59. Pivot mechanism 57 (see FIG. 1) is formed of hinge rod 49 and hinge receptacle 59 on the left side and by similar parts of torque arms 45 and 55 on the right side. Torque arm 54 has an upper end 54B with a pair of a pair of bores 60 for mating with rods 126 of mechanical connector 120 of display 28 (see FIG. 2).

Referring again to FIG. 1, articulated mechanism 36 enables display 28 to have a rather large number of viewing positions. In particular, rotation of second arm member 52 about third pivot axis 57a allows display 28 to assume a large number of spatial positions relative to computer base 22. The pivotal motion about pivot axis 47a together with the pivotal motion about pivot axes 27a and 57a enable a user to move display 22 up, down, forward, or backward to locate a preferred viewing position.

Referring to FIG. 4, a stabilizer mechanism 180 that has a pair of stabilizer arms 182 and 184 and a pair of stabilizer set controls 186 and 188. As stabilizer arm 182 and stabilizer set control 186 are substantially identical to stabilizer arm 184 and stabilizer set control 188, only the former will be described. Stabilizer arm 182 is interconnected at its upper end with hinge rod 49 and hinge receptacle 59 and its lower end with hinge rod 43 and hinge receptacle 137. Stabilizer arm 182 is pivotally connected at a pivot 190. Pushing stabilizer set control 186 to the right rocks stabilizer arm 182 counterclockwise about pivot 190 and out of engagement with hinge rods 43 and 49 and hinge receptacles 59 and 139. When stabilizer set control 186 is in this position, arms 44 and 54 are free to rotate about hinge rods 43 and 49 (pivot axes 27a and 57a) to desired angular positions. Pushing stabilizer set control 186 to the left rocks stabilizer arm 182 clockwise about pivot 190 to engage and lock hinge rods 43 and 49 and hinge receptacles 59 and 139 to selected angular positions, thereby stabilizing display 28 relative to computer base 22.

Figure 5:
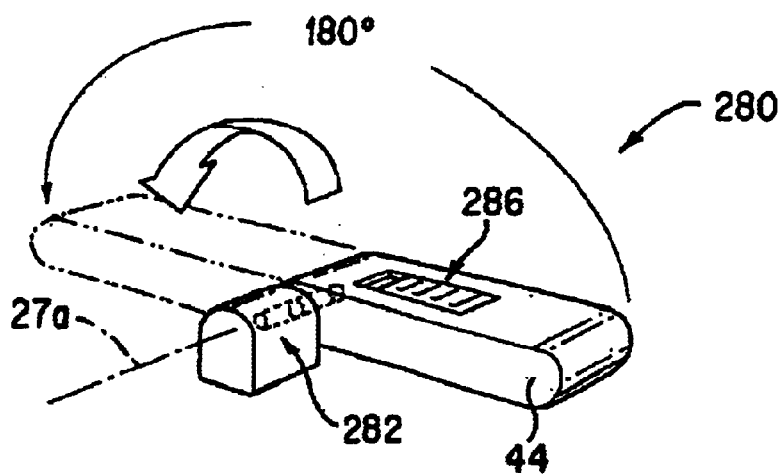
FIGS. 5 and 6 are perspective views of hinges for the computer of FIG. 1.

Referring to FIG. 5, an alternate stabilizer mechanism 280 includes a friction clutch 282 for lower torque arm 44. Friction clutch 282 limits the rotation of lower torque arm 44 about pivot axis 27a to approximately 180°. A stabilizer set control 286 stabilizes and locks lower torque arm 42 to a desired angular position. A separate substantially identical friction clutch would be provided for lower arm 45.

Figure 6:
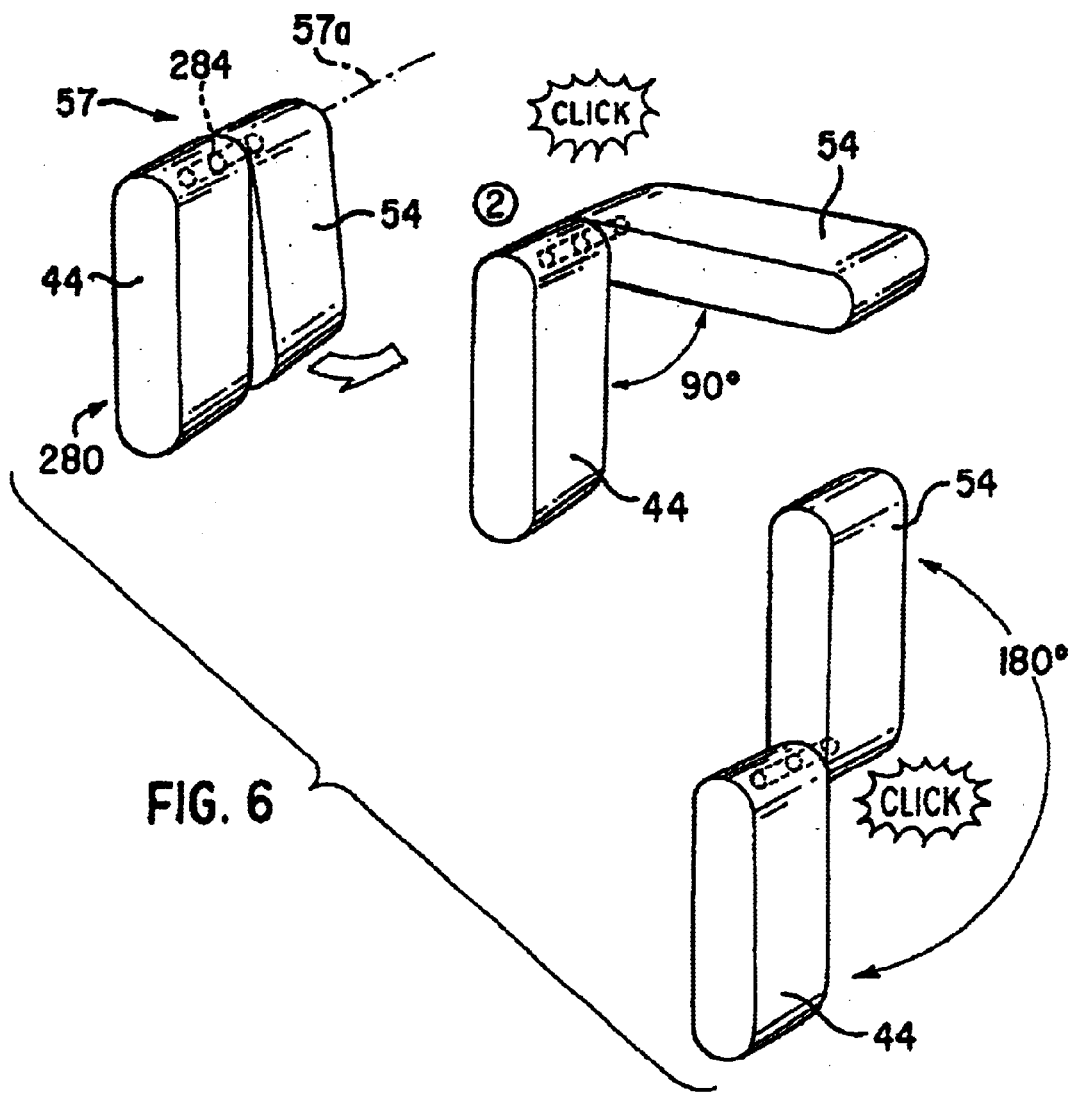

Referring to FIG. 6, stabilizer mechanism 280 also includes a friction clutch 284 for pivot mechanism 57. Friction clutch 284 is interconnected with torque arms 44 and 54. Friction clutch 284 includes detents (not shown) that click and lock at the 90°0 and 180° points of rotation of upper torque arm 54 about pivot axis 57a. The detents can be unlocked by pushing harder or by a separate locking device (not shown).

While several embodiments of the invention have been shown and described, it is to be clearly understood that the same is susceptible to numerous changes apparent to one skilled in the art. Therefore, the invention is not limited to the details shown and described. The invention is only limited by the following claims.

What is claimed is:

1. A method of reconfiguring a computer, comprising:

providing a computer base, a display, and an articulated mechanism;

providing a plurality of mechanical connectors disposed on the computer base, the display, and the articulated mechanism, wherein the plurality of mechanical connectors has size and a shape that enables the display and the computer base to be either directly interconnected in a first configuration or indirectly interconnected via the articulated mechanism in a second configuration, wherein the plurality of mechanical connectors include first and second mating pairs of mechanical connectors that are disposed on the computer base and the display, respectively, wherein the plurality of mechanical connectors further includes third and fourth pairs of mechanical connectors disposed on opposite ends of the articulated mechanism; the third and fourth pairs of mechanical connectors mating with the first and second pairs of mechanical connector, respectively, in the second configuration, wherein the first pair of mechanical connectors is located in proximity to a rear edge of the computer base, and wherein the second pair of mechanical connectors is located in proximity to a lower edge of the display, and wherein the first pair of mechanical connectors is in registry with the second and third pairs of mechanical connectors, wherein the fourth pair of mechanical connectors is in registry with the second pair of connectors.

2. The method of claim 1, wherein each of the mechanical connectors has a connecting element, and wherein the connecting elements of the second and third pairs of mechanical connectors are male elements, and wherein the connecting elements of the first and fourth pairs of mechanical connectors are female elements.

3. The method of claim 1, further comprising:

a first pivot mechanism with a first pivot axis disposed on the display; and a second pivot mechanism with a second pivot axle disposed on the articulated mechanism, wherein the display rotates about the first pivot axis on either the first or the second configuration, and wherein the articulated mechanism rotates about the second pivot axis in the second configuration.

4. A computer comprising:

a computer base having a front edge and a rear edge with a keyboard disposed on the computer base in an orientation for usage from the front edge;

a display having a viewing surface; a pivot mechanism disposed on the display;

an articulated mechanism including at least a first torque arm and a second torque arm interconnected with one another;

means for interconnecting the first torque arm with the rear edge of the computer base and the second torque arm with the pivot mechanism and the display, wherein the articulated mechanism has a motion that moves the display toward and away from the front edge and in elevation relative to the computer base;

wherein the pivot mechanism is a first pivot mechanism having a first pivot axis, wherein a second pivot mechanism with a second pivot axis is interconnected with the first torque arm and wherein the display is rotatable about the first pivot axis, and wherein the articulated mechanism is rotatable about the second pivot axis;

a third pivot mechanism with a third pivot axis interconnected with the second torque arm, the second torque arm being rotatable about the third pivot axis; and a stabilizer mechanism that stabilizes the first torque arm and the second torque arm to selected first and second angular positions, respectively, and stabilizes the display to a selected angular orientation.

5. The computer of claim 4, wherein the stabilizer mechanism includes first, second and third locking devices for locking the first torque arm to the first selected angular position, the display to the selected angular orientation and the second torque arm to the second selected angular position, respectively.

6. The computer of claim 5, wherein the stabilizer mechanism includes means that limits the rotation of the first and second torque arms to approximately 180 degree about the first and third pivot axes, respectively.

7. The computer of claim 6, wherein the stabilizer mechanism includes a first clutch interconnected with tie first pivot mechanism to control the rotation of the display a second clutch interconnected with the second pivot mechanism to control the rotation of the first torque arm, and a third clutch interconnected with the third pivot mechanism to control the rotation of the second torque arm.

* * * * *

UNITED STATES PATENT AND TRADEMARK OFFICE
CERTIFICATE OF CORRECTION

| | |
|---|---|
| PATENT NO. | : 6,882,529 B2 |
| APPLICATION NO. | : 10/163444 |
| DATED | : April 19, 2005 |
| INVENTOR(S) | : Jacques H. Helot et al. |

It is certified that error appears in the above-identified patent and that said Letters Patent is hereby corrected as shown below:

IN THE CLAIMS

Claim 1, Column 5, line 23, delete "include" and insert therefor --includes--

Signed and Sealed this

Sixth Day of November, 2007

JON W. DUDAS
*Director of the United States Patent and Trademark Office*